United States Patent [19]
Lee et al.

[11] 3,876,583
[45] Apr. 8, 1975

[54] NOVEL DICARBOXYLIC ACIDS CONTAINING DIKETOPIPERAZINE GROUPS AND POLYESTERS PREPARED THEREFROM

[75] Inventors: Lester T. C. Lee, Parsippany; Eli M. Pearce, Somerville, both of N.J.; Morton H. Litt, University Heights, Ohio

[73] Assignee: Allied Chemical Corporation, New York, N.Y.

[22] Filed: Mar. 14, 1974

[21] Appl. No.: 451,329

Related U.S. Application Data

[62] Division of Ser. No. 328,216, Jan. 31, 1973, Pat. No. 3,817,943, which is a division of Ser. No. 39,510, May 21, 1970, Pat. No. 3,728,348.

[52] U.S. Cl.............................. 260/75 N; 260/33.4 P
[51] Int. Cl............................................. C08g 17/06
[58] Field of Search................................. 260/75 N

[56] References Cited
UNITED STATES PATENTS

| | | | |
|---|---|---|---|
| 3,513,127 | 5/1970 | Marans | 260/75 N X |
| 3,515,747 | 6/1970 | Marans | 260/75 N X |
| 3,553,215 | 1/1971 | Zalewski | 260/248 |
| 3,558,630 | 1/1971 | Moyer | 260/268 |
| 3,577,371 | 5/1971 | Blair | 260/75 N X |
| 3,763,091 | 10/1973 | Crescenzi et al. | 260/75 N X |

*Primary Examiner*—Howard E. Schain
*Attorney, Agent, or Firm*—Arthur J. Plantamura

[57] ABSTRACT

Dicarboxylic acids having the formula

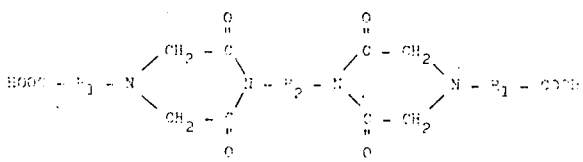

wherein $R_1$ represents a phenylene or alkylene radical and $R_2$ represents a divalent organic radical, are prepared by reacting a tricarboxylic acid having the formula $HOOCR_1N(CH_2COOH)_2$, such as nitrilotriacetic acid, with a diamine having the formula $H_2NR_2NH_2$, such as hexamethylene diamine, in a substantially 2:1 molar ratio in the presence of an inert solvent. The dicarboxylic acids are useful as monomers in preparing linear film and fiber-forming polyamides and polyesters in accordance with conventional methods for preparing such polymers from dicarboxylic acids.

4 Claims, No Drawings

NOVEL DICARBOXYLIC ACIDS CONTAINING DIKETOPIPERAZINE GROUPS AND POLYESTERS PREPARED THEREFROM

This is a division of application Ser. No. 328,216 now U.S. Pat. No. 3,817,943, filed Jan. 31, 1973, which in turn is a divisional of Ser. No. 39,510, filed May 21, 1970, now U.S. Pat. No. 3,728,348.

This invention relates to certain novel dicarboxylic acids, their method of preparation, and to linear polymers, particularly polyamides and polyesters, prepared therefrom.

The dicarboxylic acids of this invention have the formula

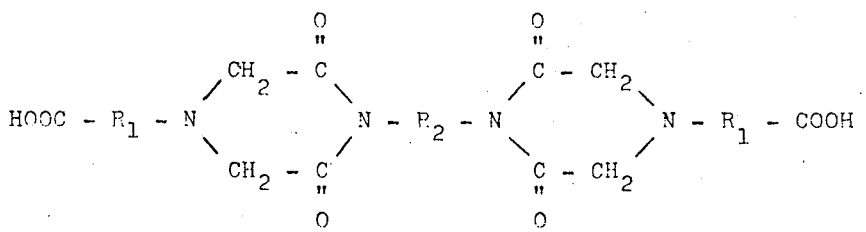

wherein $R_1$ represents a phenylene or alkylene radical and $R_2$ represents a divalent organic radical. These dicarboxylic acids are prepared by reacting a tricarboxylic acid having the formula $HOOCR_1N(CH_2COOH)_2$ with a diamine having the formula $H_2NR_2NH_2$ in a substantially 2:1 molar ratio in the presence of an inert solvent at a temperature of 40° to 220°C, as represented by the following equation

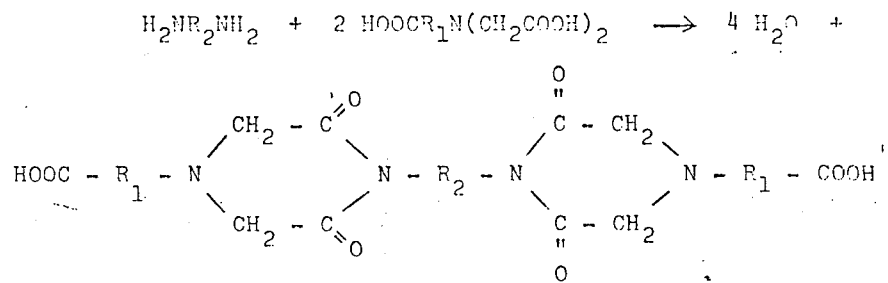

The time required for completion of the reaction is normally about 2 hours or more, up to about ten hours. The product crystallizes from the reaction mixture upon cooling to room temperature and can be recovered from the reaction mixture in accordance with conventional methods, such as by filtration.

The reaction is conveniently carried out at the reflux temperature of the reaction mixture. Hence, it is desirable to employ a solvent having a boiling point within the temperature range for the reaction, which is preferably from about 80°C to about 180°C. Suitable inert solvents include liquid polar organic solvents, such as dimethylformamide, dimethylacetamide, dimethylsulfoxide, tetrahydrofuran, and the like. It is desirable, but not essential, to add a small amount of a tertiary amine, such as triethylamine, to the reaction mixture to promote imide formation. The desired product is normally obtained at a high yield and is recovered in accordance with conventional methods, such as by filtration.

Tricarboxylic acids suitable for use in this invention have the formula $HOOCR_1N(CH_2COOH)_2$ wherein $R_1$ is a phenylene radical or an alkylene radical having 1 to 6 carbon atoms. As used herein, the term "alkylene radical" refers to alkyl diradicals having the general formula $-C_nH_{2n}-$. Especially good results are obtained using nitrilotriacetic acid. Furthermore, nitrilotriacetic acid is an inexpensive compound sold commercially in large quantities, so that a particularly advantageous feature of this invention is that it permits the preparation of valuable linear polymers containing diketopiperazine groups derived from this inexpensive compound.

Diamines suitable for preparing the dicarboxylic acids of this invention have the formula $H_2NR_2NH_2$ wherein $R_2$ is a divalent organic radical, and include, in particular, aliphatic, aromatic, and aliphatic-aromatic diamines and substituted derivatives thereof. Suitable aliphatic diamines include straight chain aliphatic diamines, such as 1,10-diaminodecane, branched chain aliphatic diamines, such as 2-methyl-1,6-diaminohexane, and cycloaliphatic diamines, such as cyclohexanediamine. The aliphatic chain can contain hetero atoms, such as sulfur or oxygen, such as represented by 3,3'-ethylenedioxybis(propylamine), and can also bear substituents, such as halogen atoms, which are nonreactive under the conditions of polymerization. The diamine can also contain an aromatic nucleus, such as represented by p-xylylenediamine. Other aromatic diamines suitable for use in this invention include diamines wherein $R_2$ in the general formula is phenylene, a fused aromatic group, such as naphthylene, or two or more linked aromatic nuclei, such as represented by biphenylene, bisphenylenemethane, bisphenylenepropane, bisphenylenesulphone, bisphenylene ether and the like. In addition, any of the aromatic groups may bear one or more nuclear substituents, such as lower alkyl groups or halogen atoms, which are nonreactive under the conditions of polymerization. The diamine preferably contains from 2 to 18 carbon atoms, more preferably 4 to 12 carbon atoms. Particularly suitable diamines include diamines of the homologous series $H_2N(CH_2)_nNH_2$ wherein $n$ is an integer from 2 to 12, preferably 4 to 8, and diamines of the general formula $H_2N(CH_2)_pZ(CH_2)_qNH_2$ wherein Z is a phenylene radical and $p$ and $q$ are independently 0, 1, 2 or 3.

The dicarboxylic acids of this invention are useful in preparing linear polyesters and polyamides in accordance with conventional methods for preparing such polymers from dicarboxylic acids. For example, polyamides are prepared by polymerizing the dicarboxylic acid with a diamine having the formula $H_2NR_3NH_2$ wherein $R_3$ is a divalent organic radical such as defined herein for $R_2$ (including the preferred embodiments thereof). Such polyamides have recurring units of the formula

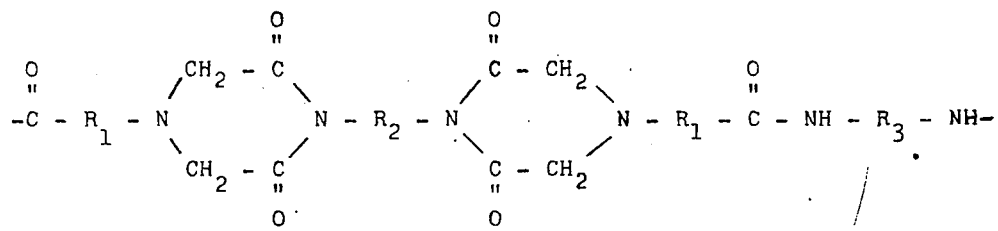

wherein $R_1$, $R_2$ and $R_3$ are as defined herein. Similarly, polyesters are prepared by polymerizing the dicarboxylic acid with a diol having the formula $OH-R_4-OH$ wherein $R_4$ is a divalent organic radical such as defined herein for $R_2$ (including the preferred embodiments thereof). Such polyesters have recurring units of the formula

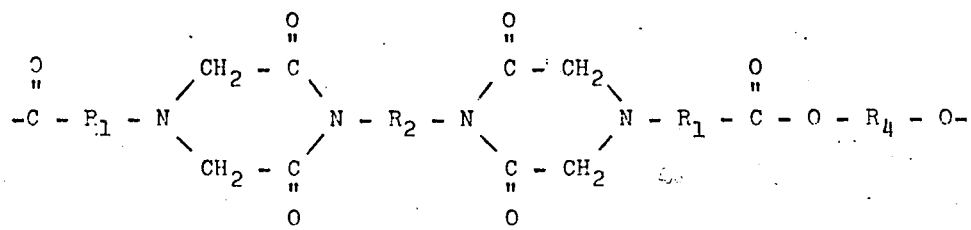

wherein $R_1$, $R_2$ and $R_4$ are as defined herein.

The polyamides of this invention are conveniently prepared by polymerizing the salt of the dicarboxylic acid and the diamine. The polymerization is carried out by maintaining the salt at an elevated temperature, generally between about 200°C and 350°C, until a polymer of film or fiber-forming molecular weight is obtained. The time required for such polymerization is normally about one hour or more, up to about seven hours. The polymerization is preferably carried out under an inert atmosphere, such as nitrogen, and also under reduced pressure to facilitate removal of the water of condensation or to allow for its expansion in a closed system.

The salt employed in the polymerization is readily prepared by dissolving a substantially 1:1 molar ratio of the dicarboxylic acid and the diamine in an inert polar organic solvent such as dimethylformamide. The salt is preferably formed under anhydrous conditions. The salt normally forms immediately and is recovered from the solvent in accordance with conventional methods, such as by filtration.

The salt polymerization procedure is generally limited to diamines wherein each amino group is directly attached to a methylene group. Diamines having amino groups attached directly to aromatic nuclei do not readily form salts with carboxylic acids; however, polyamides can be prepared from such diamines in accordance with this invention by employing conventional solution polymerization techniques using an inert polar organic solvent, such as dimethylformamide.

The polyesters of this invention can be prepared in accordance with conventional polyesterification procedures in which the dicarboxylic acid is employed directly or as the corresponding diacid chloride or lower alkyl diester. For example, the polyesters of this invention are conveniently prepared by direct esterification polymerization by heating the dicarboxylic acid with the diol in the presence of a suitable catalyst in an inert atmosphere at about 150°-200°C until evolution of water is substantially complete, followed by continued heating at higher temperatures (up to 280°C) and reduced pressures (e.g. 0.5 mm Hg) until a polymer of film-forming molecular weight is obtained. It is normally desirable to employ an excess of the diol reactant to compensate for physical losses during polymerization. Suitable polyesterification catalysts are well-known and are normally employed in an amount of 0.01–0.5% by weight. Typical catalysts include triphenylphosphite and antimony trioxide.

The polyamides and polyesters prepared in accordance with this invention are particularly useful in forming fibers and films having desirable properites, including excellent high temperature properties. More particularly, the polymers are thermally stable, have high glass transition temperatures, and yet are melt processable. The polymers can be formed into fibers and films by conventional melt methods as well as by conventional solution methods. Films of the polymers are potentially useful as separatory membranes. The polymers can also be blended with other polymers to improve their properties, especially their thermal stability. In addition to being useful in forming fibers and films, the polymers of this invention can also be molded to form shaped articles, especially for electrical applications because of the good dielectric properties of the polymers. The polymers can also be used to form adhesive compositions comprising a solution of the polymer in a volatile, polar organic solvent, such as tetrahydrofuran.

The following examples further illustrate the invention. In each example, the dicarboxylic acids and polymer structures as conforming to the general formulas for the dicarboxylic acids and polymers of this invention were confirmed by infrared spectrum and nuclear magnetic resonance analyses. All inherent viscosity measurements were made at 25°C.

EXAMPLE 1

Preparation of Dicarboxylic Acid

A solution of 1.94 grams (16.7 mmoles) of hexamethylene diamine in dimethylformamide and 10 ml of toluene was added to a stirred solution of 6.4 grams (33.4 mmoles) of nitrilotriacetic acid and dimethylformamide maintained under a nitrogen atmosphere. A total of 80 ml of dimethylformamide was employed. A white salt formed rapidly. The temperature of the reaction mixture was raised gradually and as it reached 130°C the salt began to dissolve and water of condensation began to form, indicating imide formation. Heating was continued until the reaction mixture began to reflux at 150°C. The theoretical amount of water was collected after the reaction mixture had refluxed for 4 hours. The solution was then allowed to cool to room temperature and chloroform was added to precipitate a white solid, which was recovered by filtration. The product weighed 8.17 grams and was identified as a symmetrical dicarboxylic acid conforming to the general formual for the dicarboxylic acids of this invention.

Preparation of Polyamide by Salt Polymerization

The dicarboxylic acid was dissolved in 50 ml of dimethylformamide and combined with an equal molar amount of hexamethylene diamine (1.89 grams) in 20 ml of dimethylformamide. The salt which formed was recovered by filtration and introduced into a polymerization tube which was subsequently purged with nitrogen, subjected to a vacuum and sealed. The sealed tube was maintained at 220°C for 3 hours, and at 240°C for 30 minutes. The polymer which formed was washed with water, dried under a vacuum, and found to weigh 9.80 grams (95% yield). The polymer was soluble in formic acid, sulfuric acid and m-cresol. The polymer had an inherent viscosity (0.5% in m-cresol) of 0.69, a glass transition temperature of 75°C, and a melting point of 210°C. A tough, flexible film was formed by melting the polymer.

EXAMPLE 2

Preparation of Dicarboxylic Acid

To a stirred solution of 8.67 grams (46.0 mmoles) of nitrilotriacetic acid in 50 ml of dimethylformamide maintained under a nitrogen atmosphere, there was added 10 ml of benzene, 1.0 ml of tri-n-propylamine, and a solution of 1.36 grams (23.0 mmoles) of ethylene diamine. The reaction mixture was heated to reflux and the theoretical amount of water was obtained after 3 hours.

Preparation of Polyamide by Solution Polymerization

One ml of triethylamine and 1.36 grams of ethylene diamine were added to the dicarboxylic acid prepared above, which was allowed to remain in solution. The solution was heated at reflux for 90 minutes, then the solvent was distilled off at 90°C under reduced pressure. The residue was heated at 180°C at 2.0 mm Hg pressure for 1 hour, then at 210°C at 0.2 mm pressure for 30 minutes. When cooled to room temperature, the product was a hard, tough polymer weighing 10.78 grams (93% yield). The polymer had an inherent viscosity (0.5% in m-cresol) of 0.26, a glass transition temperature of 103°C, and a melting point of 240°C. The polymer was melted to form a tough, flexible film.

EXAMPLE 3

The general procedure of Example 2 was followed except decamethylene diamine was employed in place of ethylene diamine in each preparation. The polymer obtained had an inherent viscosity (0.5% in m-cresol) of 0.56, a glass transition temperature of about 64°C, and a melting point of 185°C. A tough, flexible film was obtained by melting the polymer.

EXAMPLE 4

Preparation of Dicarboxylic Acid

One ml of tri-n-propylamine and a solution of 1.62 grams (15 mmoles) of p-phenylenediamine in 20 ml of dimethylformamide was added to a stirred solution of 5.73 grams (30 mmoles) of nitrilotriacetic acid in 60 ml of dimethylformamide. After the reaction mixture had refluxed for 3 hours, 10 ml of toluene, which forms an azeotrope with water, was added. Refluxing was continued for 2 hours, during which time the theoretical amount of water was collected.

Preparation of Polyamide by Solution Polymerization

A solution of 1.74 grams (15 mmoles) of hexamethylene diamine in 10 ml of dimethylformamide was added to the solution prepared above containing the dicarboxylic acid. After the reaction mixture had refluxed for 2 hours, the solvent was distilled off at 60°C under reduced pressure. The residue was heated at 195°C at 0.5 mm Hg pressure for 2 hours, then at 230°C for 45 minutes. When cooled to room temperature, the product was a hard, tough polymer weighing 7.60 grams (91% yield). The polymer had an inherent viscosity (0.5% in m-cresol) of 0.35 and a melting point in the range 315°–319°C. The polymer was melted and formed into a tough, flexible film.

EXAMPLE 5

Preparation of Polyester

Nitrilotriacetic acid and p-phenylenediamine were reacted in accordance with the method described in Example 4 to produce 5 grams of the resultant dicarboxylic acid. The dicarboxylic acid was combined with 30 grams of hexamethylene glycol, 0.01 gram of triphenylphosphite, and 0.001 gram of antimony trioxide in a flask. The contents of the flask were maintained at 185°C for 1 hour, during which time the solids melted and water was evolved. The pressure was then maintained at 1.0 mm Hg for 45 minutes as more water and excess hexamethylene glycol were removed. The reaction mass was then maintained at 250°C at 0.5 mm Hg for 3 hours, after which it was comminuted. Nitrogen was slowly passed through the reaction mass during the entire polymerization period. The comminuted polymer was introduced into a 100 ml flask equipped with a stirrer. Polymerization was continued in the flask at 210°C and at 0.5 mm Hg. The resultant polymer was film-forming, weighed 5.72 grams, had a melting point in the range 280°–290°C, and had an inherent viscosity (0.5% in p-chlorophenol) of 0.32.

We claim:
1. A polyester having recurring units of the formula

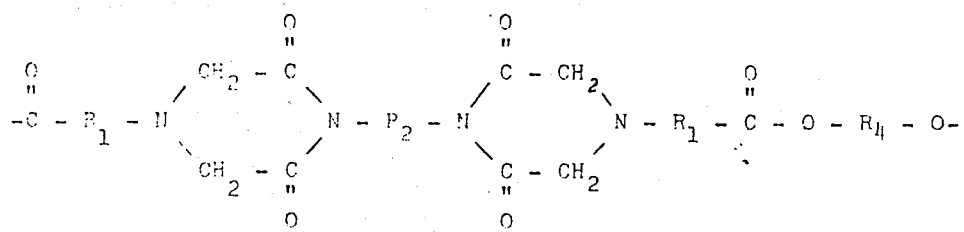

wherein $R_1$ is a phenylene radical or an alkylene radical having 1 to 6 carbon atoms, and $R_2$ and $R_4$ are organic diradicals.

2. The polyester of claim 1 wherein $R_2$ and $R_4$ are aliphatic, aromatic or aliphatic-aromatic diradicals having from 1 to 16 carbon atoms.

3. The polyester of claim 2 wherein $R_1$ is methylene.

4. The polyester of claim 3 wherein $R_2$ and $R_4$ independently have the formula $-(CH_2)_n-$ wherein $n$ is an integer from 1 to 10, or the formula $-(CH_2)_pZ(CH_2)_q-$ wherein Z is a phenylene radical and $p$ and $q$ are independently 0, 1, 2 or 3.

* * * * *